(12) United States Patent
Cutrignelli

(10) Patent No.: US 12,671,580 B2
(45) Date of Patent: Jun. 30, 2026

(54) IMAGE SENSOR, METHOD AND HOST

(71) Applicant: Sony Semiconductor Solutions Corporation, Atsugi (JP)

(72) Inventor: Luca Cutrignelli, Brussels (BE)

(73) Assignee: SONY SEMICONDUCTOR SOLUTIONS CORPORATION, Atsugi (JP)

( * ) Notice: Subject to any disclaimer, the term of this patent is extended or adjusted under 35 U.S.C. 154(b) by 38 days.

(21) Appl. No.: 18/598,104

(22) Filed: Mar. 7, 2024

(65) Prior Publication Data

US 2025/0286713 A1     Sep. 11, 2025

(51) Int. Cl.
H04L 9/14 (2006.01)
H04L 9/32 (2006.01)

(52) U.S. Cl.
CPC .............. H04L 9/14 (2013.01); H04L 9/3263 (2013.01)

(58) Field of Classification Search
CPC ................................ H04L 9/14; H04L 9/3263
See application file for complete search history.

(56) References Cited

U.S. PATENT DOCUMENTS

| | | | | |
|---|---|---|---|---|
| 2019/0097805 A1* | 3/2019 | Shin | ...................... | H04L 9/0894 |
| 2020/0260002 A1* | 8/2020 | Otsuki | ..................... | G06F 21/44 |
| 2022/0365788 A1* | 11/2022 | Koo | ....................... | G06F 9/4401 |
| 2023/0164136 A1* | 5/2023 | Kim | ...................... | H04L 9/3268 |
| | | | | 726/6 |

| | | | | |
|---|---|---|---|---|
| 2024/0370550 A1* | 11/2024 | Niemi | ..................... | G06F 21/44 |
| 2025/0112920 A1* | 4/2025 | Armstrong | .......... | H04L 63/0876 |
| 2025/0211869 A1* | 6/2025 | Kim | ....................... | H04N 25/59 |

FOREIGN PATENT DOCUMENTS

CN          208255901 U  * 12/2018

OTHER PUBLICATIONS

Ludovic Rota, "Pixels vs. Perils: Safeguarding Automotive Image Sensors in the Cybersecurity Race", https://www.onsemi.com/company/news-media/blog/automotive/pixels-vs-perils-safeguarding-automotive-image-sensors, Jul. 24, 2023, 5 pages.
NVIDIA Drive, OS Linux SDK Developer Guide 6.0.8.1 Release, "Camera Authentication", https://developer.nvidia.com/docs/drive/drive-os/6.0.8.1/public/drive-os-linux-sdk/common/topics/nvmedia_concept_nvsipl/CameraAuthentication10.html, Nov. 23, 2023, 1 page.
Philip Hawkes and Rick Wietfeldt; MIPI Alliance, "Introducing the MIPI Security Framework: Taking Security to the Next Level", https://www.mipi.org/blog/introducing-the-mipi-security-framework-taking-security-to-the-next-level, Sep. 7, 2023, 10 pages.
Sony Semiconductor Solutions Corporation; "Sony Semiconductor Solutions to Release CMOS Image Sensor for Automotive Cameras with Industry-Leading 17.42-Effective Megapixels", https://www.sony-semicon.com/en/news/2023/2023091201.html, Sep. 12, 2023, 8 pages.

* cited by examiner

*Primary Examiner* — Darshan I Dhruv
(74) *Attorney, Agent, or Firm* — XSENSUS LLP

(57) ABSTRACT

An image sensor, wherein the image sensor includes circuitry including a Camera Serial Interface, wherein the circuitry is configured to transmit a stored digital certificate to circuitry of a host via the Camera Serial Interface which authenticates the image sensor to the host, wherein the digital certificate is transmitted embedded in one or more Camera Serial Interface image frames.

17 Claims, 6 Drawing Sheets

30

40

IMAGE SENSOR, METHOD AND HOST

TECHNICAL FIELD

The present disclosure generally pertains to an image sensor, a method and a host.

TECHNICAL BACKGROUND

Generally, cameras including an image sensor are used in a variety of hosts for perception of the environment, for example, a vehicle may use the output of one or more image sensors in Advanced Driver Assistance Systems ("ADAS") or in-cabin driver monitoring.

However, there exist different cybersecurity threats which, for instance, may tamper the image sensor itself, the output of the image sensor or the control commands send to the image sensor for controlling the settings of the image sensor.

These cybersecurity threats may be exploited with malicious intent which may jeopardize the performance of the security systems applications and the host itself.

Therefore, the host should be able to verify whether an image sensor is genuine and whether the data exchanged with the image sensor has not been tampered.

There are authentication mechanisms known which verify whether the data exchanged between the host and the image sensor are not tampered.

The authentication mechanisms typically include a camera authentication, communication authentication and image authentication.

The camera authentication provides a way for the host to verify whether an image sensor is genuine for increasing a trust in the data exchange with the image sensor.

Typically, the camera authentication is performed by the host prior to establishing a secure image sensor mode setup and a secure data streaming from the image sensor.

Although there exist techniques for camera authentication, it is generally desirable to improve the existing techniques.

SUMMARY

According to a first aspect, the disclosure provides an image sensor comprising circuitry including a Camera Serial Interface, the circuitry being configured to transmit a stored digital certificate to circuitry of a host via the Camera Serial Interface which authenticates the image sensor to the host, wherein the digital certificate is transmitted embedded in one or more Camera Serial Interface image frames.

According to a second aspect, the disclosure provides a method for authenticating an image sensor to a host, comprising:

transmitting a stored digital certificate to circuitry of the host via the Camera Serial Interface which authenticates the image sensor to the host, wherein the digital certificate is transmitted embedded in one or more Camera Serial Interface image frames; and verifying the transmitted digital certificate to authenticate the image sensor.

According to a third aspect, the disclosure provides a host comprising circuitry including interface circuitry, wherein:

the interface circuitry is configured to receive a digital certificate via a Camera Serial Interface of the interface circuitry from an image sensor, wherein the digital certificate is received embedded in one or more Camera Serial Interface image frames; and the circuitry is configured to verify the received digital certificate to authenticate the image sensor.

Further aspects are set forth in the dependent claims, the drawings and the following description.

BRIEF DESCRIPTION OF THE DRAWINGS

Embodiments are explained by way of example with respect to the accompanying drawings, in which.

DETAILED DESCRIPTION OF EMBODIMENTS

Figure 3:
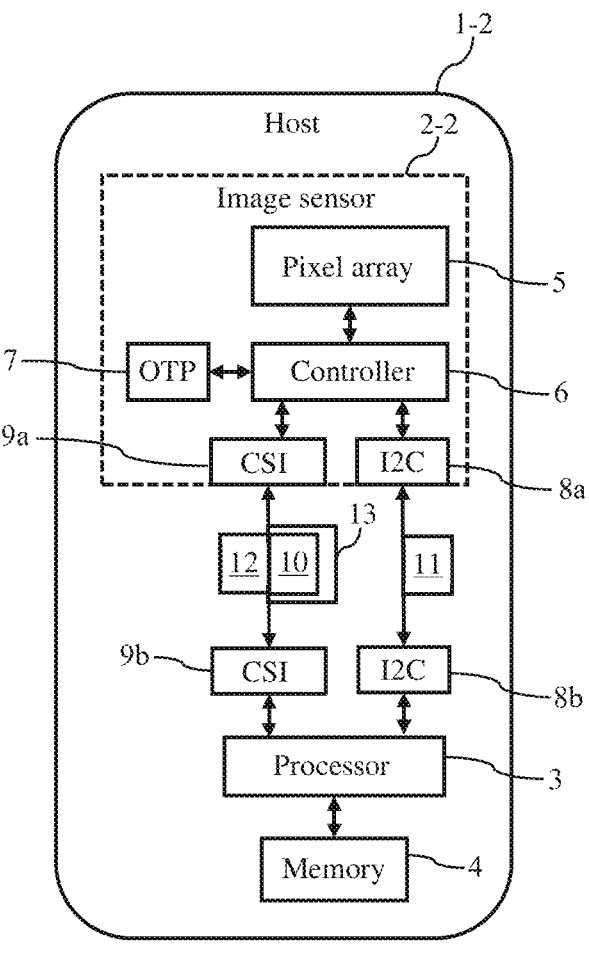
FIG. 3 schematically illustrates in a block diagram an embodiment of a host.

Before a detailed description of the embodiments under reference of FIG. 3 is given, general explanations are made.

As mentioned in the outset, there are authentication mechanisms known which verify whether the data exchanged between a host and an image sensor are not tampered, which typically include into camera authentication, communication authentication and image authentication.

As further mentioned in the outset, the camera authentication provides a way for the host to verify whether an image sensor is genuine for increasing a trust in the data exchange with the image sensor and the camera authentication is typically performed by the host prior to establishing a secure image sensor mode setup and a secure data streaming from the image sensor.

The camera authentication may be performed in different ways: SEC ("Security Enabled based on Common key") and SEP ("Security Enabled based on Public key").

In SEP, typically, the image sensor manufacturer provides a digital certificate and the corresponding private key.

At boot time, the host retrieves the digital certificate from the image sensor via host-to-image sensor communications.

In SEC, typically, the customer provides a common secret key to both the host and the image sensor.

In SEC, a digital certificate may thus not be retrieved at boot time.

In some cases, the SEP may be more convenient for the customer, since the customer does not have to program the OTP ("One-Time Programmable") memory of the image sensor himself and does not need to provide a secure memory on the host for the common secret key.

However, it has been recognized that the retrieval of the digital certificate may increase the boot time, as will be discussed in the following under reference of FIG. 1.

Figure 1:
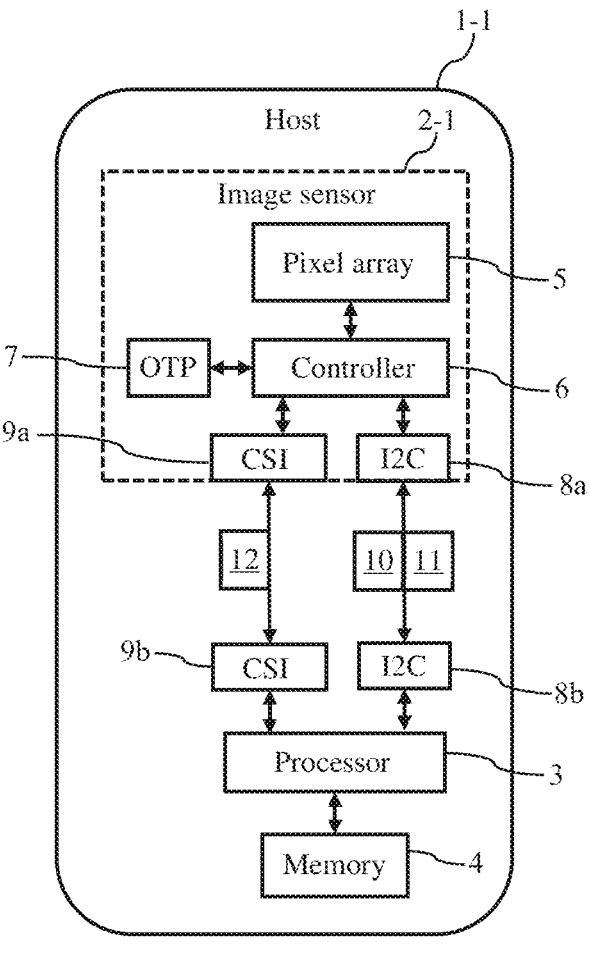
FIG. 1 schematically illustrates in a block diagram an embodiment of a host.

For enhancing the general understanding of the present disclosure an embodiment of a host 1-1 is discussed under reference of FIG. 1, which schematically illustrates the embodiment in a block diagram.

The host 1-1 may be a mobile electronic device such as a smartphone, a tablet computer, a laptop, a virtual reality device, an IoT ("Internet-of-Things") device or the like. The host may be a computing device of a vehicle such as a robot, a car, an Unmanned Arial Vehicle ("UAV") or the like.

The host 1-1 includes an image sensor 2-1, a processor 3 and memory 4.

The image sensor 2-1 includes a pixel array 5 such as a CMOS ("Complementary Metal-Oxide Semiconductor") pixel array, a CCD ("Charge-Coupled Device") or the like.

The image sensor 2-1 includes a controller 6, an OTP ("One-Time Programmable") memory, an I2C ("Inter-Integrated Circuit") or I3C interface 8a and a MIPI ("Mobile Industry Processor Interface") CSI ("Camera Serial Interface")-2 or CSI-3 9a.

The host 1-1 includes a counterpart I2C or I3C interface 8b and a counterpart MIPI CSI-2 or CSI-3 9b.

The host 1-1 and the image sensor 2-1 perform a camera authentication via the I2C or I3C interface (8a, 8b), communication authentication via the I2C or I3C interface (8a, 8b) and image authentication via the MIPI CSI-2 or CSI-3 (9a, 9b).

The camera authentication is performed for verifying whether the image sensor 2-1 is genuine. The communication authentication is performed to verify whether control and configuration commands have not been tampered. The image authentication is performed to verify whether CSI image frames have not been tampered.

Figure 2:
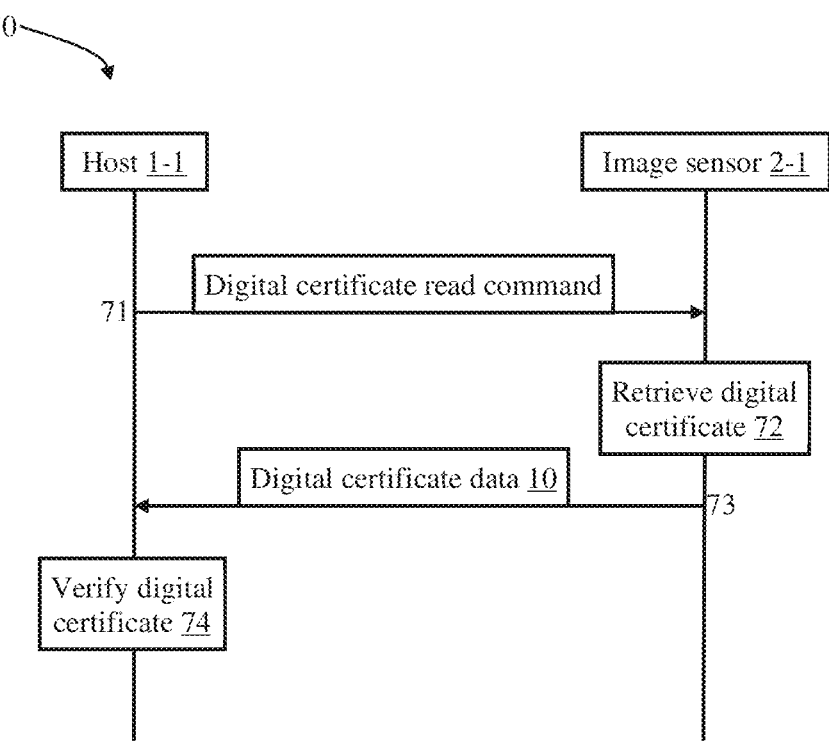
FIG. 2 schematically illustrates in a flow diagram an embodiment of a method for authenticating an image sensor to a host.

At boot time, the camera authentication is performed by the host 1-1 prior to establishing a secure image sensor mode setup and a secure data streaming from the image sensor 2-1. wherein FIG. 2 schematically illustrates an embodiment of a method 70 for authenticating the image sensor 2-1 to the host 1-1, which will be discussed in the following under reference of FIG. 1 and FIG. 2.

In particular, for the camera authentication, the processor 3 transmits, at 71, a digital certificate read command via the I2C or I3C interface 8b to the image sensor 2-1 which receives it via the I2C or I3C interface 8a.

The image sensor 2-1 has stored digital certificate data 10 representing a digital certificate in the OTP memory 7, retrieves, at 72, the digital certificate data 10 from the OTP memory 7 and transmits, at 73, the digital certificate data 10 via the I2C or I3C interface 8a. In other embodiments, a secure memory is used instead of the OTP 7 which then has stored the digital certificate.

Then, the processor 3 verifies, at 74, the transmitted digital certificate to authenticate the image sensor 2-1. For example, the processor 3 verifies a digital signature of a trusted Certificate Authority ("CA") included in the digital certificate.

Then, the host 1-1 establishes a secure image sensor mode setup and a secure data streaming from the image sensor 2-1.

In particular, the processor 3 generates a symmetric key and uses the public-key of the image sensor 2-1, which is included in the digital certificate, to transmit a copy of the symmetric key in encrypted form to the image sensor 2-1 via the I2C or I3C interface (8a, 8b).

The image sensor 2-1 has stored a private key corresponding to the public-key in the OTP 7 and uses the private key to decrypt the encrypted symmetric key received via the I2C or I3C interface (8a, 8b).

Thus, the image sensor 2-1 is able to generate, for example, Message Authentication Codes ("MACs") for the subsequent communication authentication and image authentication based on the shared symmetric key.

Then, the camera authentication is completed and a secure image sensor mode setup and a secure data streaming from the image sensor 2-1 can be established between the host 1-1 and the image sensor 2-1 based on the shared symmetric key.

Thus, for the communication authentication, communication authentication data 11, which include a control and configuration command and a MAC, are exchanged as required during runtime between the processor 3 and the image sensor 2-1, which can be verified by the processor 3 based on the MAC.

Moreover, for the image authentication, image authentication data 12, which include a CSI image frame and a MAC, are transmitted by the image sensor 2-1 to the processor 3 in a data stream during runtime, which can be verified by the processor 3 based on the MAC.

Returning to the general explanations, as mentioned above, it has thus been recognized that the retrieval of the digital certificate may increase the boot time.

However, it has been recognized by a breakdown of the camera authentication execution time that one main contributor is the read time of the digital certificate from the image sensor to the host.

As the camera authentication is considered a control activity, the camera authentication is carried out over the control and configuration interface, i.e. the I2C or I3C interface.

It has been recognized that the read time of the digital certificate may take up to several milliseconds in some cases. It has further been recognized that the read time of the digital certificate may be decreased to about a microsecond, in some embodiments, by transmitting the digital certificate via the MIPI CSI rather than transmitting it via the I2C or I3C interface.

It has thus been recognized that the camera authentication execution time may be decreased by transmitting the digital certificate via the CSI. It has been recognized that although a command and control interface is provided which enables convenient bidirectional communications, for example for responses and handshaking, part of the camera authentication process can be moved to another interface or communication channel, albeit a unidirectional one and one that is not intended for command and control.

Hence, some embodiments pertain to an image sensor, wherein the image sensor includes circuitry including a Camera Serial Interface, wherein the circuitry is configured to transmit a stored digital certificate to circuitry of a host via the CSI which authenticates the image sensor to the host, wherein the digital certificate is transmitted embedded in one or more CSI image frames.

Some embodiments pertain to a host including circuitry including interface circuitry, wherein:

the interface circuitry is configured to receive a digital certificate via a Camera Serial Interface of the interface circuitry from an image sensor, wherein the digital certificate is received embedded in one or more Camera Serial Interface image frames; and the circuitry is configured to verify the received digital certificate to authenticate the image sensor.

Some embodiments pertain to a system, wherein the system includes:

an image sensor including circuitry including a Camera Serial Interface, wherein the circuitry is configured to transmit a stored digital certificate to circuitry of the host via the CSI which authenticates the image sensor to the host, wherein the digital certificate is transmitted embedded in one or more CSI image frames; and the host including circuitry including interface circuitry, wherein the interface circuitry is configured to receive the digital certificate via a Camera Serial Interface of the interface circuitry from the image sensor and to verify the transmitted digital certificate to authenticate the image sensor.

The image sensor includes a pixel array such as a CMOS ("Complementary Metal-Oxide Semiconductor") pixel array, a CCD ("Charge-Coupled Device") or the like.

The circuitry of the image sensor includes at least an I2C ("Inter-Integrated Circuit") or I3C interface and a MIPI CSI-2 or CSI-3 interface, which may also be referred to as interface circuitry of the image sensor.

The circuitry of the image sensor may be implemented based on or may include one or more processors. A processor may be or may include an application processor, a central processing unit ("CPU"), a graphical processing unit ("GPU"), a digital signal processor ("DSP"), a field-programmable gate array ("FPGA"), an application specific integrated circuit ("ASIC") etc.

The circuitry of the image sensor may include one or more memory components. A memory component may be or may include volatile and non-volatile memory such as static random-access memory ("SRAM"), dynamic RAM ("DRAM"), non-volatile RAM ("NVRAM"), read-only memory ("ROM"), programmable ROM ("PROM"), One-Time Programmable ("OTP") memory, electrically PROM ("EPROM"), electrically erasable PROM ("EEPROM"), flash memory (e.g., NOR flash or NAND flash) etc. A memory component may be or may include one or more registers, flip-flop circuits, latch circuits, shift registers, caches, main memories, etc.

The circuitry of the image sensor may include one or more Analog-to-Digital Converters ("ADC"), Digital-to-Analog Converters ("DAC"), comparators, time counter circuits, etc.

The functionality of the circuitry of the image sensor may be implemented by hardware. The functionality of the circuitry of the image sensor may be implemented in parts by hardware and in parts by software.

The circuitry of the image sensor may be implemented by or may include typical electronic components configured to achieve the functions as described herein.

The host may be a mobile electronic device such as a smartphone, a tablet computer, a laptop, a virtual reality device, an IoT device or the like. The host may be a computing device of a vehicle such as a robot, a car, a UAV or the like.

The circuitry of the host includes at least an I2C ("Inter-Integrated Circuit") or I3C interface and a MIPI CSI-2 or CSI-3 interface, which may also be referred to as interface circuitry of the host.

The circuitry of the host may be implemented based on or may include one or more processors. A processor may be or may include an application processor, a central processing unit ("CPU"), a graphical processing unit ("GPU"), a digital signal processor ("DSP"), a field-programmable gate array ("FPGA"), an application specific integrated circuit ("ASIC") etc.

The circuitry of the host may include one or more memory components. A memory component may be or may include volatile and non-volatile memory such as static random-access memory ("SRAM"), dynamic RAM ("DRAM"), non-volatile RAM ("NVRAM"), read-only memory ("ROM"), programmable ROM ("PROM"), One-Time Programmable ("OTP") memory, electrically PROM ("EPROM"), electrically erasable PROM ("EEPROM"), flash memory (e.g., NOR flash or NAND flash) etc. A memory component may be or may include one or more registers, flip-flop circuits, latch circuits, shift registers, caches, main memories, hard disk drives, solid-state drives etc.

The circuitry of the host may include one or more Analog-to-Digital Converters ("ADC"), Digital-to-Analog Converters ("DAC"), comparators, time counter circuits, etc.

The functionality of the circuitry of the host may be implemented by hardware. The functionality of the circuitry of the host may be implemented in parts by hardware and in parts by software.

The circuitry of the host may be implemented by or may include typical electronic components configured to achieve the functions as described herein.

In some embodiments, the host is automotive control circuitry configured to control automotive functions.

The automotive functions are functions that require as an input information from an image sensor that has been authenticated to the host. The automotive functions may be safety critical.

The authentication of the image sensor protects the automotive control circuitry from a cyber attack and falsified inputs.

In some embodiments, digital certificate data representing the digital certificate are transmitted embedded in embedded data of one or more CSI image frames, as will be discussed under reference of FIG. 6 further below.

In some embodiments, digital certificate data representing the digital certificate are transmitted embedded in pixel data of one CSI image frame, as will be discussed under reference of FIG. 6 further below.

In some embodiments, the digital certificate is embedded in one or more predetermined lines of pixel data, as will be discussed under reference of FIG. 6 further below.

Some embodiments pertain to a method for authenticating an image sensor to a host, wherein the method includes:

transmitting a stored digital certificate to circuitry of the host via the CSI which authenticates the image sensor to the host, wherein the digital certificate is transmitted embedded in one or more CSI image frames; and verifying the transmitted digital certificate to authenticate the image sensor.

The method may be performed by the system as described herein.

In some embodiments, digital certificate data representing the digital certificate are transmitted embedded in embedded data of one or more Camera Serial Interface image frames, as will be discussed under reference of FIG. 6 further below.

In some embodiments, digital certificate data representing the digital certificate are transmitted embedded in pixel data of one Camera Serial Interface image frame, as will be discussed under reference of FIG. 6 further below.

In some embodiments, the digital certificate is embedded in one or more predetermined lines of pixel data, as will be discussed under reference of FIG. 6 further below.

In some embodiments, the authenticating is performed by public key-based device authentication and key sharing is performed via information exchanged between the image sensor and the host via an inter-integrated circuit interface.

In some embodiments, the method includes a boot up sequence of the host further including receiving command and control data from the image sensor via the inter-integrated circuit interface; and reading the digital certificate from data received via the CSI interface.

In some embodiments, key confirmation is performed via information exchanged between the image sensor and host via the inter-integrated circuit interface.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 3, an embodiment of a host 1-2 is discussed in the following under reference of FIG. 3, FIG. 4, FIG. 5 and FIG. 6, wherein FIG. 3 schematically illustrates the embodiment of the host 1-2 in a block diagram.

The host 1-2 is based on the host 1-1 of FIG. 1 and has the same configuration, however, except for the image sensor 2-2 of the host 1-2 that transmit the digital certificate data 10 via the MIPI CSI-2 or CSI-3 (9a, 9b) to the processor 3 of the host 1-2 instead of transmitting it via the I2C or I3C interface (8a, 8b) as the image sensor 2-1 of the host 1-1 of FIG. 1.

Figure 4:
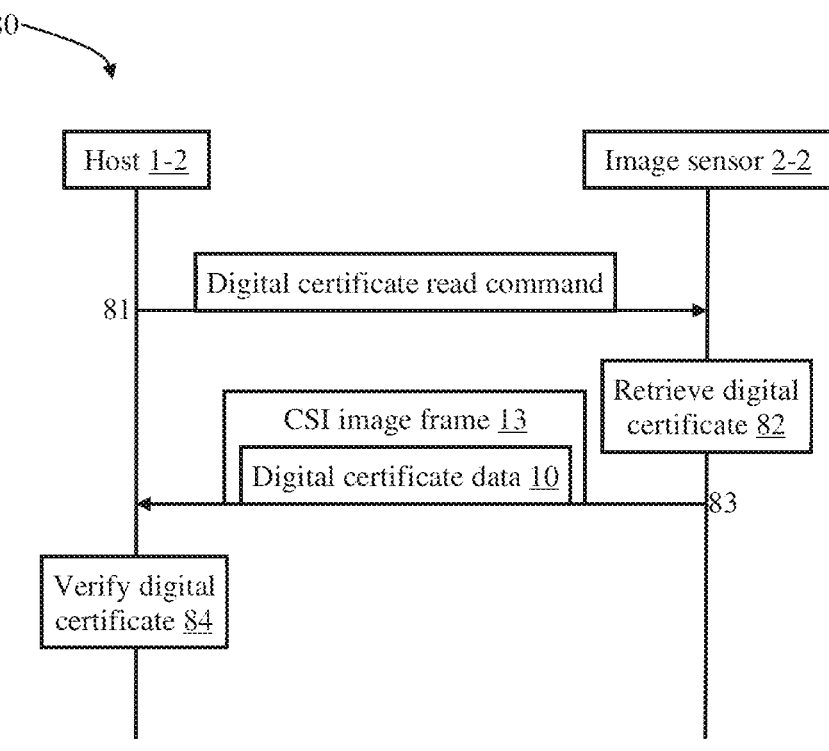
FIG. 4 schematically illustrates in a flow diagram an embodiment of a method for authenticating an image sensor to a host.

FIG. 4 schematically illustrates an embodiment of a method 80 for authenticating the image sensor 2-2 to the host 1-2, which will be discussed in the following under reference of FIG. 3 and FIG. 4.

Hence, the processor 3 transmits, at 81, a digital certificate read command via the I2C or I3C interface 8b to the image sensor 2-2 which receives it via the I2C or I3C interface 8a.

As before, the image sensor 2-2 has stored digital certificate data 10 representing the digital certificate in the OTP memory 7 and retrieves, at 82, the digital certificate data from the OTP memory 7.

Then, the image sensor 2-2 transmits, at 83, the digital certificate data 10 embedded in one or more CSI image frames 13 via the MIPI CSI-2 or CSI-3 (9a, 9b) to the processor 3.

Then, the processor 3 verifies, at 84, the transmitted digital certificate to authenticate the image sensor 2-2. For example, the processor 3 verifies a digital signature of a trusted Certificate Authority ("CA") included in the digital certificate.

The transmission of the digital certificate data 10 embedded in one or more CSI image frames may decrease the camera authentication execution time and, thus, may decrease a boot time of the host 1-2 compared to the host 1-1 of FIG. 1.

Figure 5:
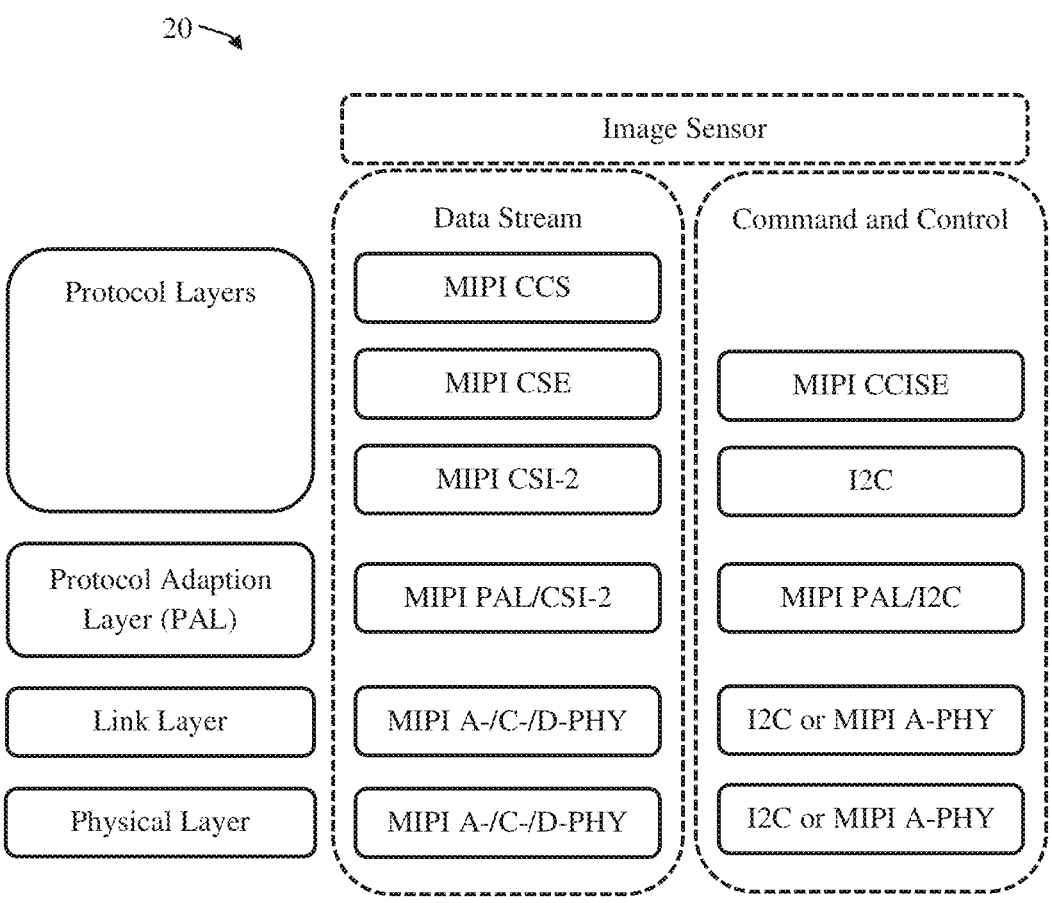
FIG. 5 schematically illustrates in a block diagram an embodiment of a MIPI Image Sensor Stack.

An embodiment of a MIPI Image Sensor Stack 20 is discussed in the following under reference of FIG. 3 and FIG. 5, wherein FIG. 5 schematically illustrates the embodiment of the MIPI Image Sensor Stack 20 in a block diagram.

As mentioned above, the image sensor 2-2 of FIG. 3 transmits the digital certificate data 10 embedded in one or more CSI image frames 13 via the MIPI CSI-2 or CSI-3 (9a, 9b) to the processor 3.

While the MIPI Image Sensor Stack 20 defines MIPI Command and Control Interface Service Extensions ("MIPI CCISE"), the digital certificate data 10 are transmitted via the MIPI CSI-2, since the MIPI CCISE defines security extensions to apply data integrity protection and optional encryption to I2C-based command and control interfaces.

Generally, the image sensor 2-2 provides at the input of the Protocol Layer of the Data Stream Stack of the MIPI Image Sensor Stack 20 data to be transmitted to the processor 3 of the host 1-2.

The underlying layers, which include a Protocol Adaption Layer (PAL) and a Link Layer and a Physical Layer, are responsible for shaping the data in the actual physical interface.

Hence, the image sensor 2-2 provides at the input of the Protocol Layer of the Data Stream Stack of the MIPI Image Sensor Stack 20 the digital certificate data 10 to be transmitted to the processor 3 of the host 1-2. In particular, the image sensor 2-2 provides the digital certificate data 10 at the input of the MIPI CSI-2 in some embodiments.

Generally, when a host needs to control multiple image sensors or auxiliary devices, the control stream via the I2C is typically used in a configuration with one master and multiple slaves. This may be useful if control sequences have to be synchronized across different image sensors or auxiliary devices.

In contrast, the data stream via MIPI CSI-2 is instead a dedicated point-to-point interface between host and image sensor. Using this interface to read the digital certificates of image sensors may allow to perform read operations on multiple image sensors in parallel without need of serializing the reads of different sensors over the same control interface.

Figure 6:
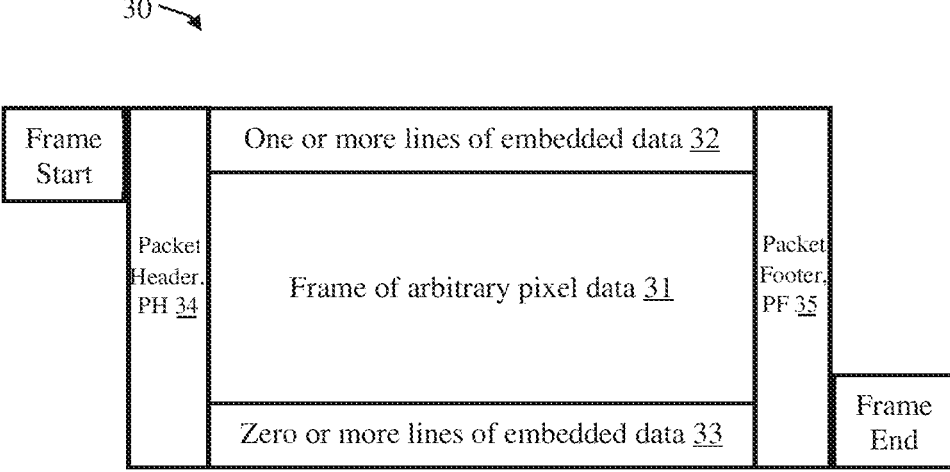
FIG. 6 schematically illustrates in a block diagram an embodiment of a CSI image frame structure.

An embodiment of a CSI image frame structure 30 is discussed in the following under reference of FIG. 3 and FIG. 6, wherein FIG. 6 schematically illustrates the embodiment of the CSI image frame structure 30 in a block diagram.

As mentioned above, the image sensor 2-2 of FIG. 3 transmits the digital certificate data 10 embedded in one or more CSI image frames 13 via the MIPI CSI-2 or CSI-3 (9a, 9b) to the processor 3.

The CSI image frame structure 30 defines pixel data and embedded data, wherein the embedded data are designated as front or rear depending on their position with respect to the pixel data. The embedded data typically carry information relate to image sensor configuration on image sensor collected statistics.

Thus, the CSI image frame structure 30 includes a frame of pixel data 31, front embedded data 32, rear embedded data 33, a packet header 34 and a packet footer 35.

The digital certificate data 10 may be transmitted embedded in one or more CSI image frames by two approaches.

The digital certificate data 10 representing the digital certificate may be transmitted embedded in embedded data of one or more CSI image frames 13.

In such embodiments, one or a few CSI image frames 13 may suffice for carrying the digital certificate data 10 embedded in the embedded data. The number of CSI image frames 13 needed may depend on the number and size of the embedded lines in the front embedded data 32 and rear embedded data 33 supported by the image sensor 2-2.

For example, in such a case, one or more small CSI image frames 13 having a limited number of pixel data lines may be used.

The digital certificate data representing the digital certificate may be transmitted embedded in pixel data of one CSI image frame 13.

Alternatively, one small CSI image frame 13 with only a few lines of pixel data may accommodate the digital certificate data 10 if pixel data are used to carry the digital certificate.

In both above cases, i.e. whether embedded data or pixel data are used for embedding the digital certificate data 10, the circuitry of the image sensor 2-2 takes care of transmitting the digital certificate data 10 from the OTP 7 into the right streaming channel of the MIPI CSI-2.

The decision of using one or the other approach might depend on host preference related to host drivers handling the data stream.

Figure 7:
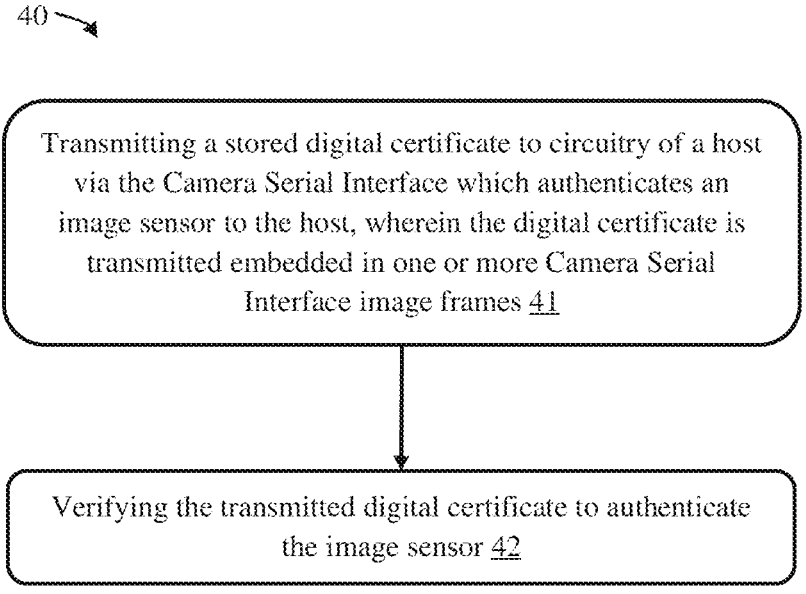
FIG. 7 schematically illustrates in a flow diagram an embodiment of a method for authenticating an image sensor to a host.

An embodiment of a method 40 for authenticating an image sensor to a host is schematically illustrated in a flow diagram in FIG. 7, which is discussed in the following.

The method 40 may be performed by the system as described herein.

At 41, a stored digital certificate is transmitted to circuitry of a host via the Camera Serial Interface which authenticates an image sensor to the host, wherein the digital certificate is transmitted embedded in one or more Camera Serial Interface image frames, as discussed herein.

At 42, the transmitted digital certificate is verified to authenticate the image sensor, as discussed herein.

It should be recognized that the embodiments describe methods with an exemplary ordering of method steps. The specific ordering of method steps is however given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image sensor including circuitry including a Camera Serial Interface, wherein the circuitry is configured to transmit a stored digital certificate to circuitry of a host via the Camera Serial Interface which authenticates the image sensor to the host, wherein the digital certificate is transmitted embedded in one or more Camera Serial Interface image frames.

(2) The image sensor of (1), wherein digital certificate data representing the digital certificate are transmitted embedded in embedded data of one or more Camera Serial Interface image frames.

(3) The image sensor of (1), wherein digital certificate data representing the digital certificate are transmitted embedded in pixel data of one Camera Serial Interface image frame.

(4) The image sensor of (3), wherein the digital certificate is embedded in one or more predetermined lines of pixel data.

(5) A method for authenticating an image sensor to a host, wherein the method includes:

transmitting a stored digital certificate to circuitry of the host via the Camera Serial Interface which authenticates the image sensor to the host, wherein the digital certificate is transmitted embedded in one or more Camera Serial Interface image frames; and verifying the transmitted digital certificate to authenticate the image sensor.

(6) The method of (5), wherein digital certificate data representing the digital certificate are transmitted embedded in embedded data of one or more Camera Serial Interface image frames.

(7) The method of (5), wherein digital certificate data representing the digital certificate are transmitted embedded in pixel data of one Camera Serial Interface image frame.

(8) The method of (7), wherein the digital certificate is embedded in one or more predetermined lines of pixel data.

(9) The method of anyone of (5) to (8), wherein the authenticating is performed by public key-based device authentication and key sharing is performed via information exchanged between the image sensor and the host via an inter-integrated circuit interface.

(10) The method of (9), wherein the method includes a boot up sequence of the host further including receiving command and control data from the image sensor via the inter-integrated circuit interface; and reading the digital certificate from data received via the CSI interface.

(11) The method of (9) or (10), wherein key confirmation is performed via information exchanged between the image sensor and host via the inter-integrated circuit interface.

(12) A host including circuitry including interface circuitry, wherein:

the interface circuitry is configured to receive a digital certificate via a Camera Serial Interface of the interface circuitry from an image sensor, wherein the digital certificate is received embedded in one or more Camera Serial Interface image frames; and the circuitry is configured to verify the received digital certificate to authenticate the image sensor.

(13) The host of (12) wherein the host is automotive control circuitry configured to control automotive functions.

(14) A system, wherein the system includes:

an image sensor including circuitry including a Camera Serial Interface, wherein the circuitry is configured to transmit a stored digital certificate to circuitry of the host via the CSI which authenticates the image sensor to the host, wherein the digital certificate is transmitted embedded in one or more CSI image frames; and the host including circuitry including interface circuitry, wherein the interface circuitry is configured to receive the digital certificate via a Camera Serial Interface of the interface circuitry from the image sensor and to verify the transmitted digital certificate to authenticate the image sensor.

The invention claimed is:

1. An image sensor comprising:

circuitry including a Camera Serial Interface, the circuitry being configured to transmit a stored digital certificate to host circuitry of a host via the Camera Serial Interface which authenticates the image sensor to the host, wherein the digital certificate is transmitted embedded in one or more Camera Serial Interface image frames, a Camera Serial Interface image frame among the one or more Camera Serial Interface image frames comprising both embedded data and a pixel data frame, and the digital certificate is embedded in one or more predetermined lines of the embedded data as front embedded data, rear embedded data, or a combination thereof.

2. The image sensor of claim 1, wherein:

the digital certificate data representing the digital certificate are transmitted embedded in the embedded data of the one or more Camera Serial Interface image frames.

3. A method for authenticating an image sensor to a host, comprising:

transmitting a stored digital certificate to host circuitry of the host via a Camera Serial Interface which authenticates the image sensor to the host, wherein the digital certificate is transmitted embedded in one or more Camera Serial Interface image frames; and verifying the transmitted digital certificate to authenticate the image sensor, wherein a Camera Serial Interface image frame among the one or more Camera Serial Interface image frames comprising both embedded data and a pixel data frame, and the digital certificate is embedded in one or more predetermined lines of the embedded data as front embedded data, rear embedded data, or a combination thereof.

4. The method of claim 3, wherein:

the digital certificate data representing the digital certificate are transmitted embedded in the embedded data of the one or more Camera Serial Interface image frames.

5. The method of claim 3, wherein:

the authenticating is performed by public key-based device authentication and key sharing is performed via information exchanged between the image sensor and the host via an inter-integrated circuit interface.

6. The method of claim 5, wherein:

the method comprises a boot up sequence of the host further comprising receiving command and control data from the image sensor via the inter-integrated circuit interface; and reading the digital certificate from data received via the Camera Serial Interface.

7. The method of claim 5, wherein:

key confirmation is performed via information exchanged between the image sensor and the host via the inter-integrated circuit interface.

8. A host comprising host circuitry including interface circuitry, wherein:

the interface circuitry is configured to receive a digital certificate via a Camera Serial Interface of the interface circuitry from an image sensor, wherein the digital certificate is received embedded in one or more Camera Serial Interface image frames; and the host circuitry is configured to verify the received digital certificate to authenticate the image sensor, wherein a Camera Serial Interface image frame among the one or more Camera Serial Interface image frames comprising both embedded data and a pixel data frame, and the digital certificate is embedded in one or more predetermined lines of the embedded data as front embedded data, rear embedded data, or a combination thereof.

9. The host of claim 8, wherein:

the host is automotive control circuitry configured to control automotive functions.

10. The image sensor of claim 1, wherein:

the one or more predetermined lines of the embedded data are embedded as one or more lines of the front embedded data and zero or more lines of the rear embedded data.

11. The image sensor of claim 1, wherein the circuitry is further configured to:

transmit the digital certificate embedded within the embedded data of the one or more Camera Serial Interface image frames, the embedded data being positioned either before or after the pixel data frame.

12. The image sensor of claim 1, wherein:

the circuitry is configured to generate a Message Authentication Code (MAC) for subsequent image authentication based on a shared symmetric key established after verifying the digital certificate.

13. The method of claim 3, wherein:

the one or more predetermined lines of the embedded data are embedded as one or more lines of the front embedded data and zero or more lines of the rear embedded data.

14. The method of claim 3, wherein the circuitry is further configured to:

transmit the digital certificate embedded within the embedded data of the one or more Camera Serial Interface image frames, the embedded data being positioned either before or after the pixel data frame.

15. The host of claim 8, wherein:

the one or more predetermined lines of the embedded data are embedded as one or more lines of the front embedded data and zero or more lines of the rear embedded data.

16. The host of claim 8, wherein the circuitry is further configured to:

transmit the digital certificate embedded within the embedded data of the one or more Camera Serial Interface image frames, the embedded data being positioned either before or after the pixel data frame.

17. The host of claim 8, wherein:

the circuitry is configured to generate a Message Authentication Code (MAC) for subsequent image authentication based on a shared symmetric key established after verifying the digital certificate.

* * * * *